United States Patent [19]
Kimura

[11] Patent Number: 5,969,830
[45] Date of Patent: Oct. 19, 1999

[54] COLOR LINEAR IMAGE SENSOR AND DRIVING METHOD THEREFOR

[75] Inventor: Tetsuji Kimura, Tokyo, Japan

[73] Assignee: NEC Corporation, Tokyo, Japan

[21] Appl. No.: 08/861,221

[22] Filed: May 21, 1997

[30] Foreign Application Priority Data

May 30, 1996 [JP] Japan .................... 8-136704

[51] Int. Cl.$^6$ .............. H04N 1/04; H04N 1/46; H04N 3/14

[52] U.S. Cl. .............. 358/483; 358/514; 358/513; 348/272; 348/315

[58] Field of Search .................. 358/514, 513, 358/512, 482, 483; 348/313, 294, 272, 304, 312, 303, 311, 315, 316, 317, 320, 321, 322, 323; 257/215

[56] References Cited

U.S. PATENT DOCUMENTS

| | | | |
|---|---|---|---|
| 5,241,377 | 8/1993 | Kaneda | 257/215 |
| 5,345,319 | 9/1994 | Yu | 358/483 |
| 5,539,536 | 7/1996 | Maki et al. | 348/311 |
| 5,539,539 | 7/1996 | Fujimoto et al. | 358/518 |
| 5,631,702 | 5/1997 | Miwada | 348/272 |
| 5,801,850 | 9/1998 | Maki et al. | 358/483 |

FOREIGN PATENT DOCUMENTS

| | | |
|---|---|---|
| 62-147765 | 7/1987 | Japan . |
| 4360455 | 12/1992 | Japan . |
| 5268524 | 10/1993 | Japan . |
| 6037970 | 2/1994 | Japan . |
| 7203123 | 8/1995 | Japan . |
| 8065450 | 3/1996 | Japan . |
| 8088728 | 4/1996 | Japan . |

OTHER PUBLICATIONS

NEC Data Sheet; MOS Integrated Circuit uPD3725:Document No. S11324EJ1V0DS00 Date Published Mar. 1996.

*Primary Examiner*—Joseph Mancuso
*Assistant Examiner*—Hien Truong
*Attorney, Agent, or Firm*—Foley & Lardner

[57] ABSTRACT

The object of the present invention is to reduce the line distance between light receiving elements for three colors of RGB of a color linear image sensor to reduce the required storage capacity for an external memory. The color linear image sensor is constructed such that a charge transfer element is disposed between each two adjacent light receiving elements of three rows and a charge read-out element is disposed between each charge transfer element and each of the light receiving elements on the opposite sides of the charge transfer element such that, when signal charges from the light receiving elements for different colors are to be transferred, each of the character transfer elements is used commonly and time divisionally by the centrally located light receiving elements and the light receiving elements on each of the opposite sides of the centrally located light receiving elements.

27 Claims, 8 Drawing Sheets

1A, 1B, 1C ... LIGHT RECEIVING ELEMENT
2A1, 2A2, 2B1, 2B2, 2C1, 2C2 ... SIGNAL CHARGE READ-OUT ELEMENT
3A1, 3AB, 3BC, 3C2 ... SIGNAL CHARGE TRANSFER ELEMENT
4A1, 4AB, 4BC, 4C2 ... OUTPUT CIRCUIT
L1, L2, L3, L4 ... PULSE LINE 1A, 1B, 1C . . . LIGHT RECEIVING ELEMENT
2A1, 2A2, 2B1, 2B2, 2C1, 2C2 . . . SIGNAL CHARGE READ-OUT ELEMENT
3A1, 3A2, 3B1, 3B2, 3C1, 3C2 . . . SIGNAL CHARGE TRANSFER ELEMENT
4A1, 4A2, 4B1, 4B2, 4C1, 4C2 . . . OUTPUT CIRCUIT
L1, L2, L3, L4 . . . PULSE LINE

5 ... ALUMINUM WIRING LINE (FOR FEEDING CLOCK φ1, φ2)
6, 7, 9 ... CONTACT
8 ... ALUMINUM WIRING LINE (FOR FEEDING CLOCK φTG1, φTG2)
10 ... POLYCRYSTALLINE SILICON ELECTRODE
    (FOR FORMATION OF SIGNAL CHARGE READ-OUT ELEMENT)
11A, 11B ... POLYCRYSTALLINE SILICON ELECTRODE
    (FOR FORMATION OF SIGNAL CHARGE TRANSFER ELEMENT)
12 ... ELEMENT SEPARATION REGION 1A, 1B, 1C . . . LIGHT RECEIVING ELEMENT
2A1, 2A2, 2B1, 2B2, 2C1, 2C2 . . . SIGNAL CHARGE READ-OUT ELEMENT
3A1, 3AB, 3BC, 3C2 . . . SIGNAL CHARGE TRANSFER ELEMENT
4A1, 4AB, 4BC, 4C2 . . . OUTPUT CIRCUIT
L1, L2, L3, L4 . . . PULSE LINE

5 ... ALUMINUM WIRING LINE (FOR FEEDING CLOCK φ1, φ2)
6, 7, 9 ... CONTACT
8 ... ALUMINUM WIRING LINE (FOR FEEDING CLOCK φTG1, φTG2)
10 ... POLYCRYSTALLINE SILICON ELECTRODE
       (FOR FORMATION OF SIGNAL CHARGE READ-OUT ELEMENT)
11A, 11B ... POLYCRYSTALLINE SILICON ELECTRODE
       (FOR FORMATION OF SIGNAL CHARGE TRANSFER ELEMENT)
12 ... ELEMENT SEPARATION REGION 1A, 1B, 1C ... LIGHT RECEIVING ELEMENT
2A1, 2A2, 2B1, 2B2, 2C1, 2C2 ... SIGNAL CHARGE READ-OUT ELEMENT
3A1, 3AB, 3BC, 3C2 ... SIGNAL CHARGE TRANSFER ELEMENT
4A1, 4AB, 4BC, 4C2 ... OUTPUT CIRCUIT
L1, L4 ... PULSE LINE

5 ... ALUMINUM WIRING LINE (FOR FEEDING CLOCK $\phi 1$, $\phi 2$)
6, 7, 13 ... CONTACT
10 ... POLYCRYSTALLINE SILICON ELECTRODE
   (FOR FORMATION OF SIGNAL CHARGE READ-OUT ELEMENT)
11A, 11B, 11C ... POLYCRYSTALLINE SILICON ELECTRODE
   (FOR FORMATION OF SIGNAL CHARGE TRANSFER ELEMENT)
12 ... ELEMENT SEPARATION REGION

COLOR LINEAR IMAGE SENSOR AND DRIVING METHOD THEREFOR

BACKGROUND OF THE INVENTION

1. Field of the Invention

This invention relates to a color linear image sensor and a driving method therefor, and more particularly to a technique for reducing the line distance of a color linear image sensor.

2. Description of the Related Art

In recent years, as personal computers increase in numbers and requirements for high performances of copying machines increase, a demand for color linear image sensors for reading a color image increases. A color linear image sensor is normally constructed such that three CCD linear image sensors having a charge transferring function are disposed in parallel to each other and color filters for different colors such as, for example, red (R), green (G) and blue (B) filters are mounted on light receiving element rows of the CCD linear image sensors.

FIG. 1 is a schematic view showing a general construction of a conventional example of such a color linear image sensor as described above. Operation of the conventional example is described with reference to FIG. 1.

Signal charges produced in light receiving elements 1A (R), 1B (G) and 1C (B) on which RGB color filters (not shown) are mounted are read out by signal charge read-out elements $2A_1$, $2A_2$, $2B_1$, $2B_2$ and $2C_1$, $2C_2$ into adjacent signal charge transfer elements $3A_1$, $3A_2$, $3B_1$, $3B_2$ and $3C_1$, $3C_2$. Charge read-out elements $2A_1$, $2A_2$, $2B_1$, $2B_2$ and $2C_1$, $2C_2$ mentioned above read out signal charges $Q_1, Q_3, Q_5, \ldots$ in odd-numbered rows and signal charges $Q_2, Q_4, Q_6, \ldots$ in even-numbered rows of the light receiving elements into the different charge transfer elements in response to clocks $\phi_{TG1}$, $\phi_{TG2}$, $\phi_{TG3}$. Flows of the signal charges are indicated by white arrows in FIG. 1.

In the CCD linear image sensors, signal charge transfer elements $3A_1$, $3A_2$, $3B_1$, $3B_2$ and $3C_1$, $3C_2$ are normally formed from two-phase driven CCDs of the ion implantation barrier type. Further, in order to supply clocks $\phi_1$ and $\phi_2$ for the two-phase driven CCDs, pulse lines $L_1, L_2, L_3$ and $L_4$ are disposed on the outer sides of the charge transfer elements (on the sides on which the light receiving elements are not provided). Flows of signals of clocks $\phi_1$ and $\phi_2$ are indicated by arrows in FIG. 1.

The signal charges transferred by signal charge transfer elements $3A_1$, $3A_2$, $3B_1$, $3B_2$ and $3C_1$, $3C_2$ are outputted via output circuits $4A_1$, $4A_2$, $4B_1$, $4B_2$ and $4C_1$, $4C_2$ so that color signals are obtained. Each of the output circuits includes a signal charge detection element formed from a floating diffused region for converting a signal charge into a signal voltage, and an analog circuit such as a source follower and an inverter.

FIG. 2 is a timing chart illustrating a driving method for the conventional example of the color linear image sensor shown in FIG. 1. A driving method employed conventionally is described with reference to FIG. 2.

The signal charges of light receiving elements 1A, 1B and 1C are accumulated for periods wherein clocks $\phi_{TG1}$, $\phi_{TG2}$ and $\phi_{TG3}$ applied to charge read-out elements $2A_1, 2A_2, 2B_1, 2B_2$ and $2C_1, 2C_2$ exhibit a low level (L) (accumulation time=T) and then read out to predetermined signal charge transfer elements $3A_1$, $3A_2$, $3B_1$, $3B_2$ and $3C_1$, $3C_2$ for periods wherein clocks $\phi TG_1, \phi TG_2$ and $\phi TG_3$ exhibit a high level (H), respectively.

Thereafter, in the individual charge transfer elements, the signal charges are transferred in response to two-phase clocks $\phi_1$ and $\phi_2$ having opposite phases to each other. Then, the signal charges are outputted as signals $V_{out(R/odd)}$, $V_{out(R/even)}$, $V_{out(G/odd)}$, $V_{out(G/even)}$ and $V_{out(B/odd)}$, $V_{out(B/even)}$ through six different output circuits $4A_1$, $4A_2$, $4B_1$, $4B_2$ and $4C_1$, $4C_2$, respectively (it is to be noted that, in FIG. 2, a reset pulse applied to each pixel in the charge detection elements of the output circuits is omitted).

Where such a color linear image sensor as described above is employed for a scanner or a copying machine, the three CCD linear image sensors on which the color filters are mounted are scanned perpendicularly to the direction in which the CCD linear image sensors are disposed. In order to obtain information of a color (for example, RGB) of an image at a predetermined location on an imaging object, it is necessary to store color information of the first and second lines on the outside after the predetermined location is scanned by the first line (for example, R) until scanning by the third line (for example, B) is completed and to effect signal processing after all of the color information of the three colors becomes available. Therefore, an external memory having a considerably large storage capacity is required, which gives rise to a problem that an increase in cost of the entire apparatus is invited.

For example, with a color linear image sensor of the class of 5,000 pixels×3 rows which is used for a color copying machine or a color scanner of a high resolution, where the gradation is represented by 8 bits, the required storage capacity C for the external memory is $$C = 5{,}000 \times 8 \times 3 \times (m+1) \text{ bits} \tag{1}$$

where m is a line distance between two adjacent light receiving element rows represented in terms of a number of scanning times. For example, where the size of one pixel of the R, G and B light receiving elements is 14 $\mu$m×14 $\mu$m, and the line distance between the light receiving element rows is 168 $\mu$m for both between R-G and between G-B, m is $$m = 168 \, \mu\text{m}/14 \, \mu\text{m} = 12 \tag{2}$$

Accordingly, the capacity C of the external memory is 1,560,000 bits.

As can be recognized from expression (1), in order to minimize the external memory capacity, the distance between the three light receiving element rows must be minimized to minimize the number of scanning times for a period of time after the first line (for example, R) is scanned until the third line (for example, B) is scanned.

Therefore, the line distance in FIG. 1 is examined here. Region $X_3$ surrounded by a broken line in FIG. 1 is shown in an enlarged scale in FIG. 3. Referring to FIG. 3, clocks $\phi$ and $\phi_2$ of two phases are applied to a pair of aluminum wiring lines 5. Aluminum wiring lines 5 are connected via contacts 6 to polycrystalline silicon electrodes 11A of CCD registers which form signal charge transfer elements $3A_2$ and $3B_1$. Polycrystalline silicon electrodes 11A are connected via contacts 7 to polycrystalline silicon electrodes 11B which similarly form the CCD registers. Clocks $\phi TG_1$ and $\phi TG_2$ for driving charge read-out elements $2A_2$ and $2B_1$ are applied to aluminum wiring lines 8. Aluminum wiring lines 8 are connected via contacts 9 to polycrystalline silicon electrodes 10 which form charge read-out elements. The pixels of the light receiving elements and the charge transfer elements are separated from each other bad element separation region 12.

As can be seen from FIG. 3, main factors which define the line distance (distance from the centers of light receiving elements 1A to the centers of light receiving elements 1B) are:

(1) the dimension of one pixel of light receiving elements 1A and 1B;

(2) the dimension of two charge read-out elements 2A2 and 2B1;

(3) the dimension of two signal charge transfer elements 3A$_2$ and 3B$_1$; and (4) the dimension of element separation region 12 between the two charge transfer elements (including dimensions of pulse lines).

For example, in the example shown in FIG. 3, the dimension of one pixel of the light receiving elements is 14 $\mu$m, the dimension of the charge read-out elements is 10 $\mu$m×2, the dimension of the charge transfer elements is 42 $\mu$m×2, and the dimension of the element separation region between the two charge transfer elements is 42 $\mu$m, and besides the total dimension of connection portions of the elements of (1) to (3) is 8 $\mu$m. Therefore, the line distance is 168 $\mu$m (m=12).

From among the four factors listed above, since the factor (1) is a prescribed pixel dimension, it cannot be varied.

The dimension of the factor (2) cannot be reduced to 10 $\mu$m or less readily because it is limited by contact regions 9 for connection between aluminum wiring lines 8 for driving the charge read-out elements and polycrystalline silicon electrodes 10 which form the charge-read out elements.

With regard to the factor (3), as this dimension decreases, the maximum signal charge amount which can be handled by the charge transfer elements decreases and the dynamic range of the output signals decreases. Accordingly, careless decrease of the dimension gives rise to degradation of the characteristic.

With regard to the factor (4), it is not easel to reduce the dimension because two aluminum wiring lines 5, 5 for supplying clocks $\phi_1$ and $\phi_2$ and polycrystalline silicon electrodes 11B which form the charge transfer elements are connected to each other by contacts 6 on element separation region 12, and also polycrystalline silicon electrodes 11A and 11B are connected to each other by contacts 7.

In short, it is difficult to vary any of the factors (1) to (4) described above, and further reduction of the line distance cannot be anticipated with a color linear image sensor having such a construction as shown in FIGS. 1 and 3.

SUMMARY OF THE INVENTION

According to the present invention, a color linear image sensor formed on a semiconductor substrate including three rows of light receiving elements, signal charge transfer elements disposed on the opposite sides of each of the light receiving elements, and signal charge read-out elements for reading out signal charges from the light receiving elements into the signal charge transfer elements, is characterized in that only one signal charge transfer element is provided between each two adjacent light receiving elements of the three rows, and the centrally positioned light receiving elements and those of the light receiving elements positioned on the opposite sides of the centrally positioned light receiving elements commonly and time divisionally use the signal charge transfer elements disposed between the centrally positioned light receiving elements and the opposite side light receiving elements.

The color linear image sensor described above is driven by a driving method wherein signal charges from the centrally located light receiving elements of the three rows are read out to the signal charge transfer elements positioned on the opposite sides of the centrally located light receiving elements, and, when the read out signal charges are to be transferred, reading out of signal charges from the light receiving elements on the opposite sides to the signal charge transfer elements on the opposite sides of the centrally located light receiving elements is interrupted for a time until transfer of all of the signal charges from the centrally located light receiving elements is completed.

In the prior art color linear image sensor, each light receiving element has a total of two signal charge transfer elements provided on the opposite sides thereof. In other words, two signal charge transfer elements are disposed between two adjacent light receiving elements. In the present invention, since only one signal charge transfer element is provided between adjacent light receiving elements, the line distance is reduced.

In the color linear image sensor of the present invention, since the single signal charge transfer element is used time divisionally by the centrally located light receiving elements and the light receiving elements on the opposite sides of the centrally located light receiving elements, RGB outputs are displaced from each other in time. However, since color information of the colors of RGB is temporarily stored into an external memory and signal processing is performed after the information of all of the three colors becomes available as described hereinbefore, there is no problem in color regeneration of a still picture by a color copying machine or a color scanner.

DETAILED DESCRIPTION OF THE PREFERRED EMBODIMENTS

Figure 4:
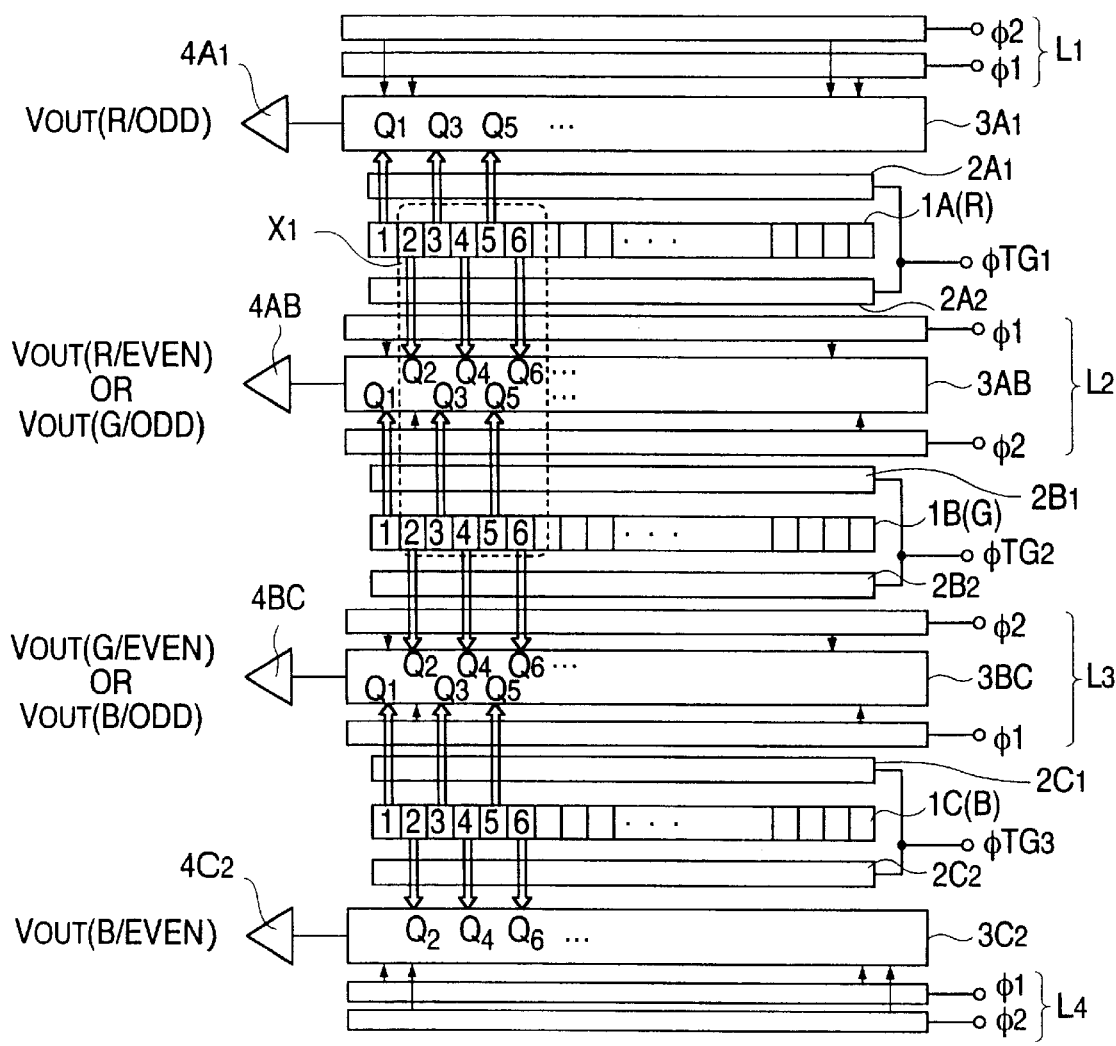
FIG. 4 is a schematic view showing a general construction of a color linear image sensor according to a first embodiment of the present invention.

Next, embodiments of the present invention are described with reference to the drawings. FIG. 4 is a schematic view showing a general construction of a color linear image sensor according to a first embodiment of the present invention, and the first embodiment of the present invention is described with reference to FIG. 4.

Figure 1:
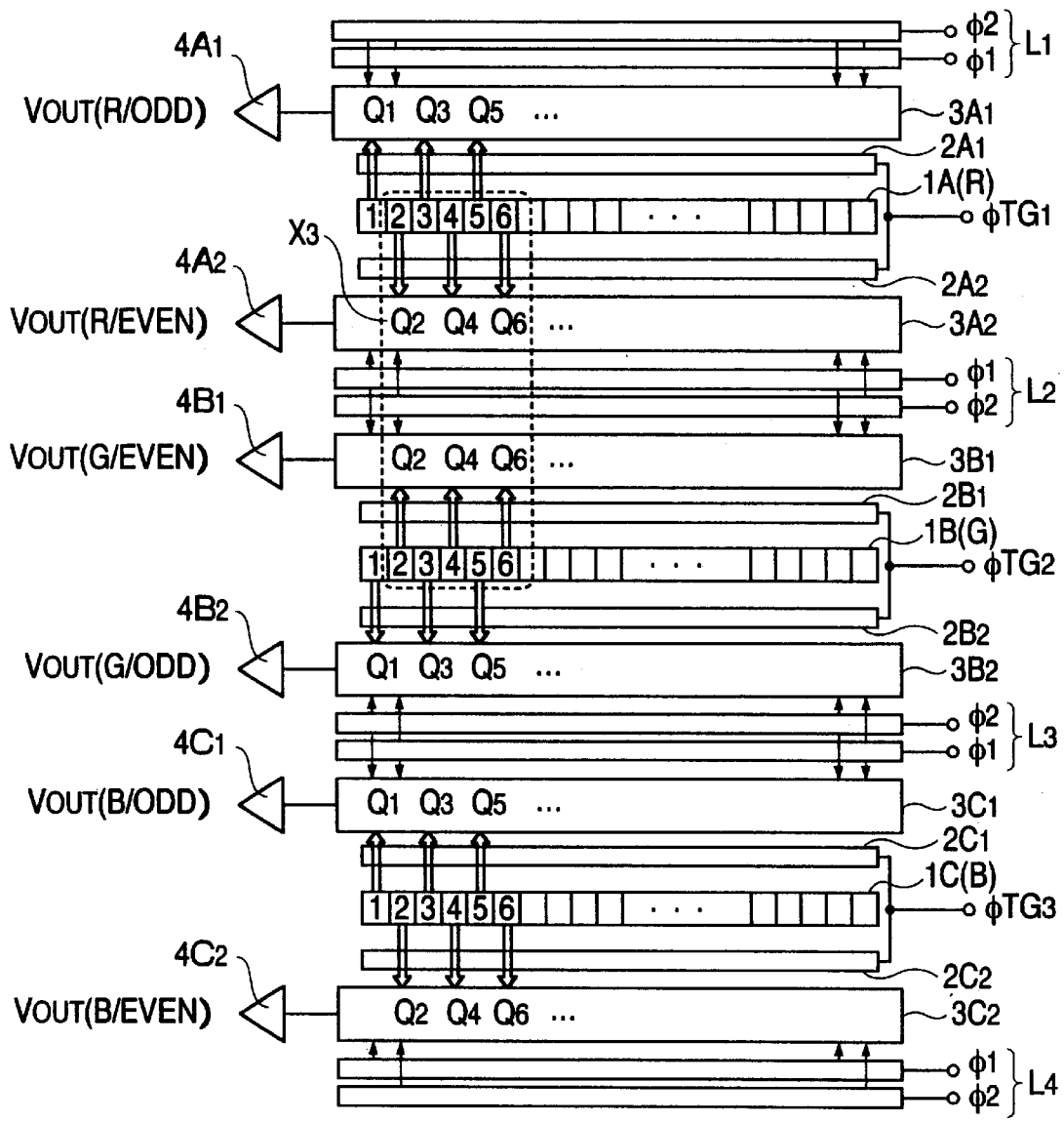
FIG. 1 is a schematic view showing a general construction of an example of a color linear image sensor according to the prior art.
Figure 2:
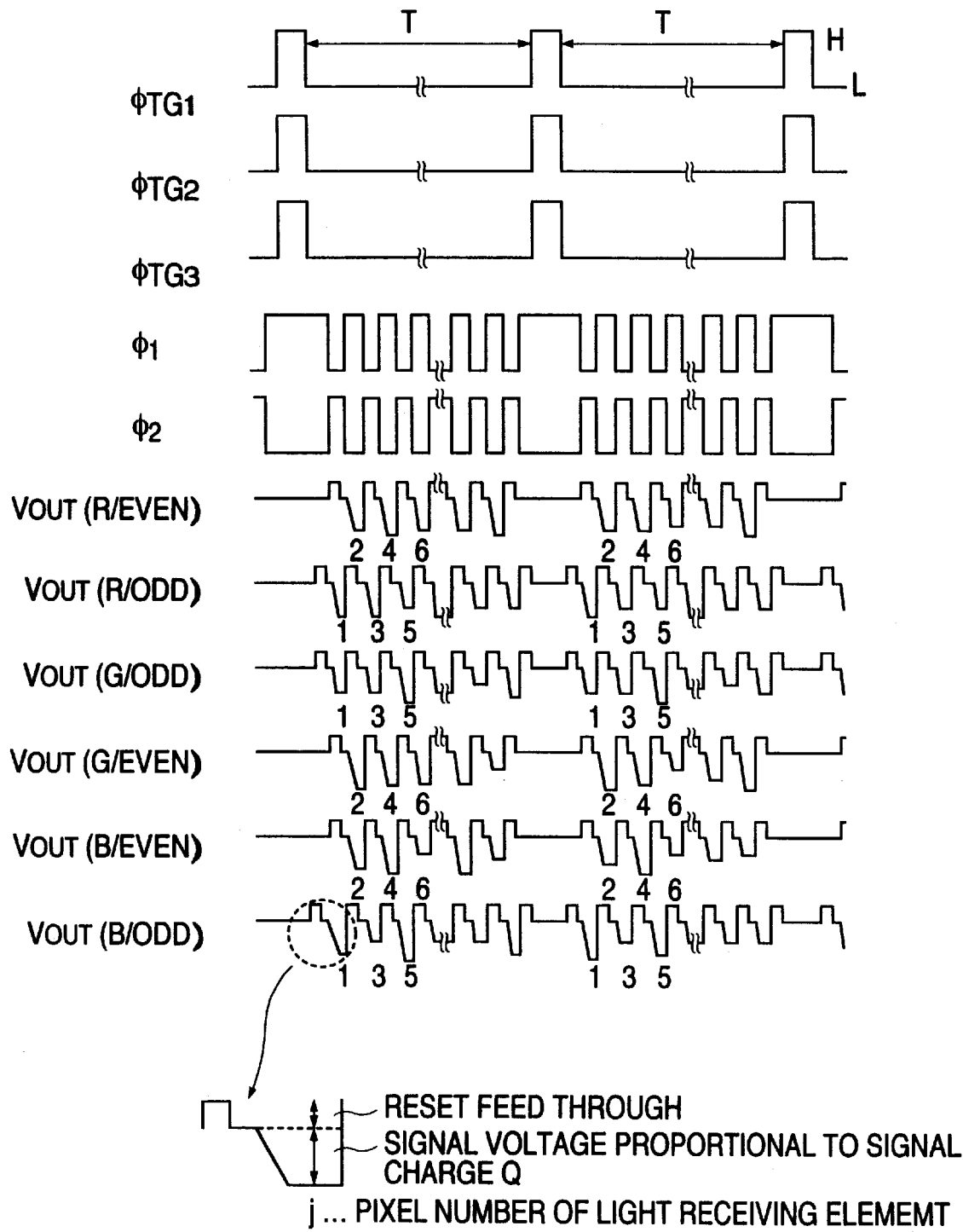
FIG. 2 is a timing chart of the color linear image sensor shown in FIG. 1.

Light receiving elements 1A and 1C which are positioned on the opposite outer sides of the three rows of light receiving elements, two sets of charge read-out elements 2A$_1$, 2A$_2$ and 2C$_1$, 2C$_2$ adjacent to those light receiving elements, two signal charge transfer elements 3A$_1$ and 3C$_2$ on the outer sides of the charge read-out elements, two output circuits $4A_1$ and $4C_2$ and two pulse lines $L_1$, and $L_4$ in the present embodiment have quite same constructions and dimensions as those of the prior art linear image sensor shown in FIG. 1.

The other construction of the present embodiment than those described above is described below. A charge transfer element for transferring even-numbered signal charges $Q_2$, $Q_4$, $Q_6$, . . . of light receiving elements 1A and another charge transfer element for transferring odd-numbered signal charges $Q_1$, $Q_3$, $Q_5$, . . . of light receiving elements 1B read out by charge read-out element 2B1 are formed commonly as a single charge transfer element 3AB. Also two output circuits in the prior art linear image sensor are formed commonly as a single output circuit 4AB. Further, a charge transfer element for transferring even-numbered signal charges $Q_2$, $Q_4$, $Q_6$, . . . of light receiving elements 1C and another charge transfer element for transferring odd-numbered signal charges $Q_1$, $Q_3$, $Q_5$, . . . of light receiving elements 1B read out bad charge read-out element $2B_2$ are formed commonly as a single charge transfer element (charge transfer element 3BC). Also output circuit 4BC is formed as a common output circuit.

Figure 5:
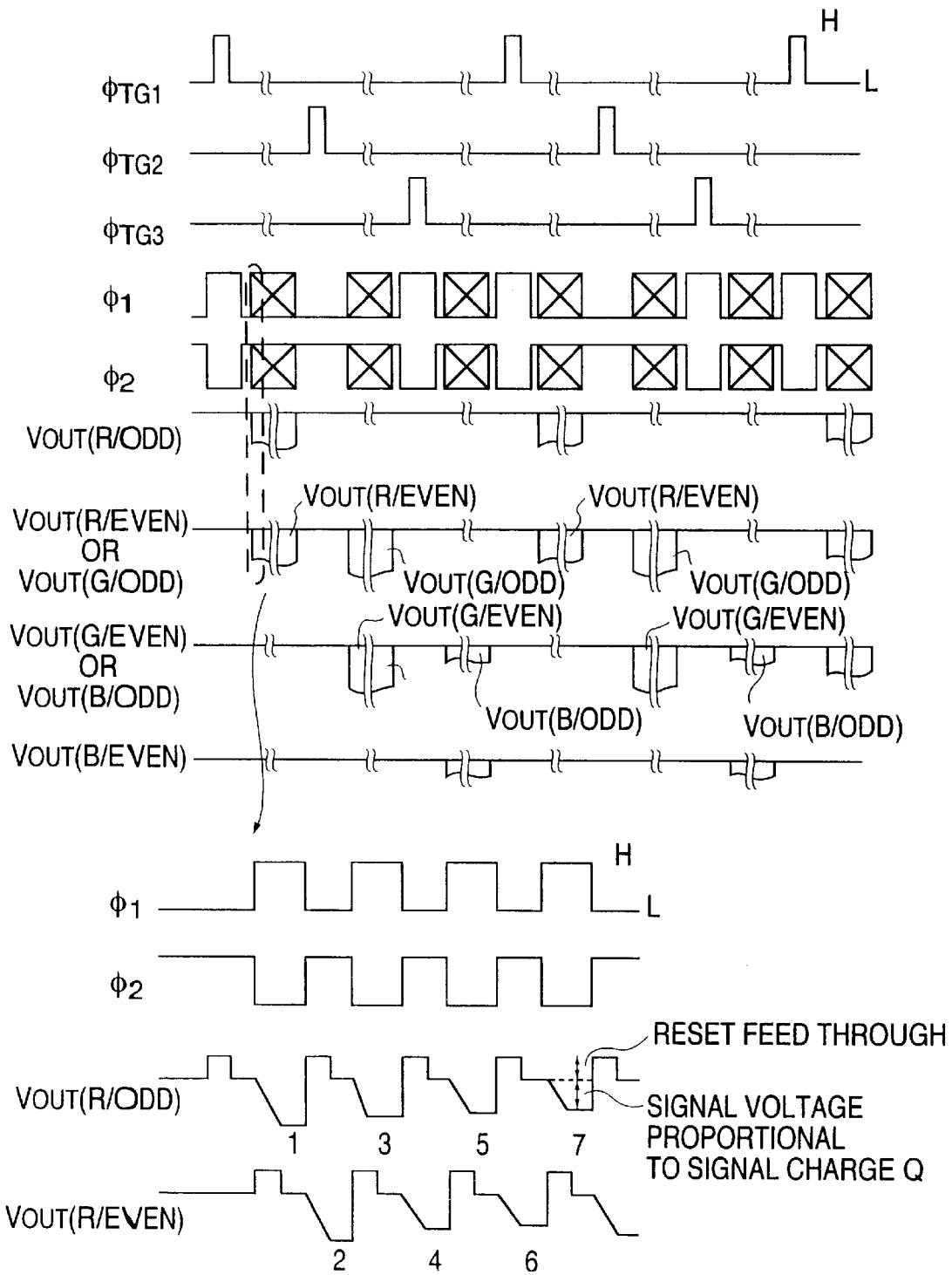
FIG. 5 is a timing chart of the first embodiment.

In the following, operation of the present embodiment is described. FIG. 5 is an example of a timing charge when the color linear image sensor according to the present embodiment is driven, and driving operation of the present embodiment is described below with reference to FIG. 5.

First, pulse $\phi TG_1$ is set to the H level to drive two charge read-out elements $2A_1$ and $2A_2$ adjacent to light receiving elements 1A to read out signal charges $Q_1, Q_2, Q_3, \ldots$ of the pixels of light receiving elements 1A into signal charge transfer elements $3A_1$ and 3AB, respectively. Then, signal charges of the pixels of light receiving elements 1A are transferred in accordance with two-phase clocks $\phi1$ and $\phi2$ supplied from pulse lines L1 and L2 to signal charge transfer elements $3A_1$ and 3AB, respectively. Upon this transfer, signal charge transfer element $3A_1$ transfers odd-numbered signal charges $Q_1, Q_3, Q_5, \ldots$ of light receiving elements 1A.

Meanwhile, signal charge transfer element 3AB transfers even-numbered signal charges $Q_2, Q_4, Q_6, \ldots$ of light receiving elements 1A. Results of the transfer are outputted as output signals $V_{out(R/odd)}$ and $V_{out(R/even)}$ output circuits $4A_1$ and 4AB, respectively.

Then, after all of the signal charges of light receiving elements 1A are outputted, pulse $\phi TG_2$ is set to the H level to drive charge read-out elements $2B_1$ and $2B_2$ adjacent to light receiving elements 1B to read out signal charges $Q_1, Q_2, Q_3, \ldots$ of the pixels of light receiving elements 1B into signal charge transfer elements 3AB and 3BC, respectively. Then, signal charges of the pixels of light receiving elements 1B are transferred in accordance with two-phase clocks $\phi_1$ and $\phi_2$ supplied from pulse lines $L_2$ and $L_3$ to signal charge transfer elements 3AB and 3BC, respectively. Upon this transfer, signal charge transfer element 3AB transfers odd-numbered signal charges $Q_1, Q_3, Q_5, \ldots$ of light receiving elements 1B, and charge transfer element 3BC transfers even-numbered signal charges $Q_2, Q_4, Q_6, \ldots$ of light receiving elements 1B. Results of the transfer are outputted as output signals $V_{out(G/odd)}$ and $V_{out(G/even)}$ from output circuits 4AB and 4BC, respectively.

Finally, after all of the signal charges of light receiving elements 1B are outputted, pulse $\phi TG_3$ is set to the H level to drive charge read-out elements $2C_1$ and $2C_2$ adjacent to light receiving elements 1C to read out signal charges $Q_1$, $Q_2, Q_3, \ldots$ of pixels of light receiving elements 1C into charge transfer elements 3BC and $3C_2$, respectively. Then, the signal charges of the pixels of light receiving elements 1C are transferred in accordance with two-phase clocks $\phi_1$ and $\phi_2$ supplied front pulse lines $L_3$ and $L_4$ to charge transfer elements 3BC and $3C_2$, respectively. Upon this transfer, charge transfer element 3BC transfers odd-numbered signal charges $Q_1, Q_3, Q_5, \ldots$ of light receiving elements 1C, and charge transfer element $3C_2$ transfers even-numbered signal charges $Q_2, Q_4, Q_6, \ldots$ of light receiving elements 1C. Results of the transfer are outputted as output signals $V_{out(B/odd)}$ and $V_{out(B/even)}$ from output circuits 4BC and $4C_2$, respectively.

By repeating the sequence of operations described above, a series of RGB outputs is obtained. Here, the color information of RGB is temporarily stored into an external memory as described hereinbefore. Then, since signal processing is performed after the information of the three colors becomes available, even if the RGB outputs are displaced from each other in time as seen from the timing chart of FIG. 5, there is no problem in regeneration of colors of a color image (e.g., a still picture by a color copying machine or a color scanner).

Figure 6:
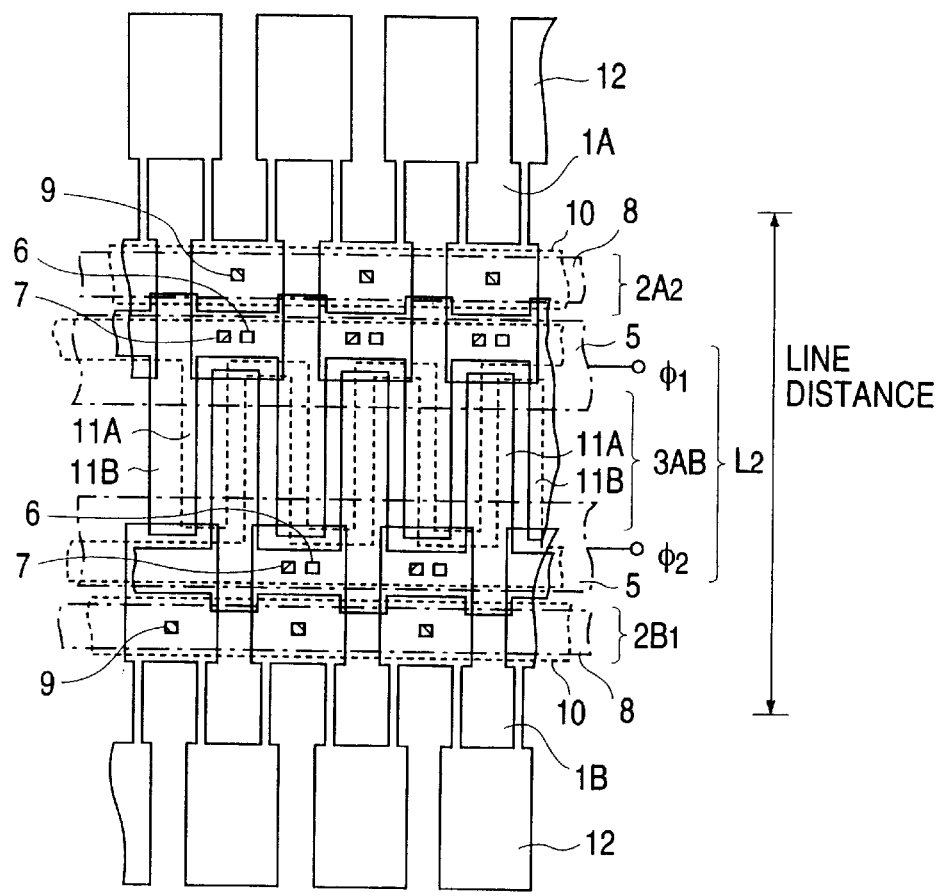
FIG. 6 is a schematic view showing a region surrounded by broken line X$_1$ in FIG. 4 in an enlarged scale.

Next, the line distance in the present embodiment is described. FIG. 6 is an enlarged view of region X1 surrounded by a broken line in FIG. 4. Referring to FIG. 6, light receiving elements 1A, 1B, charge read-out elements $2A_2$ $2B_1$ and charge transfer element 3AB have equal dimensions to those of light receiving elements 1A, 1B, charge read-out elements $2A_2$, $2B_1$ and charge transfer element $3A_2$ or $3B_1$ in FIG. 3, respectively.

Figure 3:
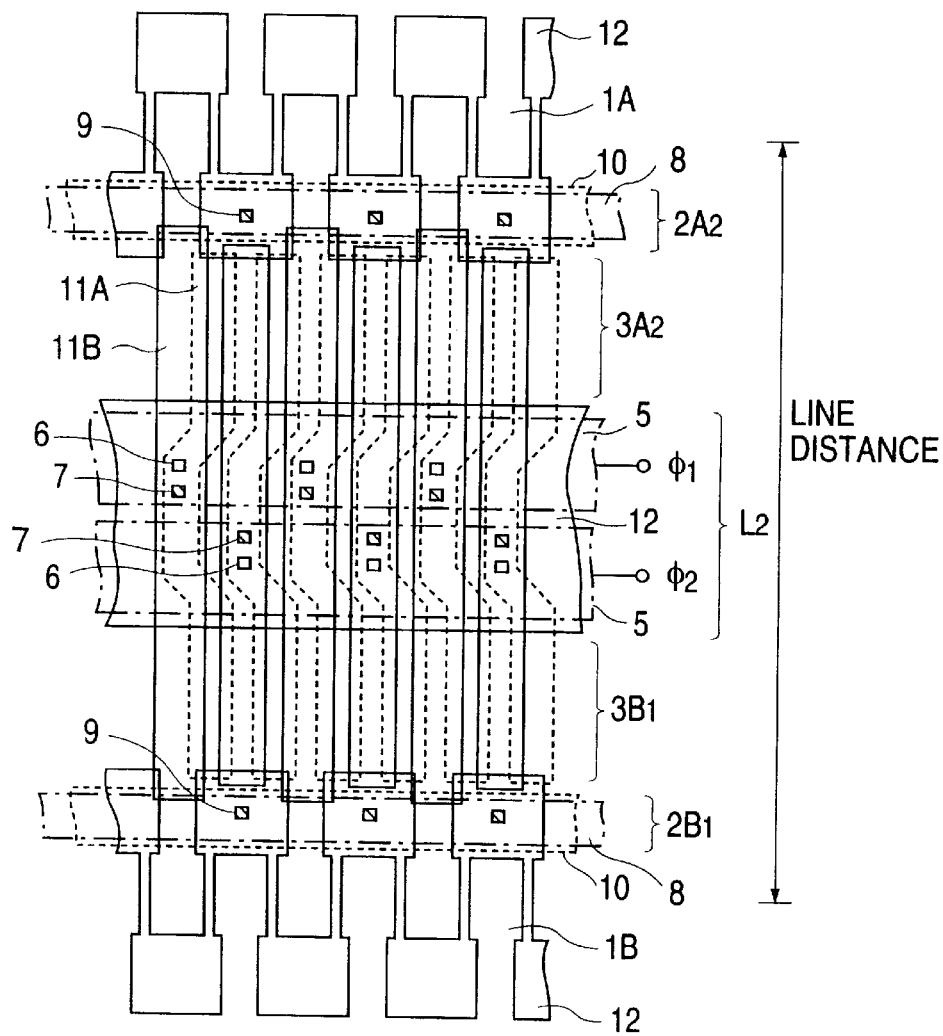
FIG. 3 is a schematic view showing a region surrounded by broken line X$_3$ in FIG. 1 in an enlarged scale.

Comparing FIG. 6 with FIG. 3, in the present embodiment, from among the factors which define the line distance, as a charge transfer element between adjacent light receiving elements, only one signal charge transfer element 3AB is involved, and the number of such charge transfer elements is reduced to one while two such charge transfer elements are provided in the prior art linear image sensor. Accordingly, the line distance can be reduced. As an example, where the dimensional example of the prior art linear image sensor shown in FIGS. 1 and 3 described hereinbefore is used, since the dimension of signal charge transfer element 3AB is 42 μm, the line distance is reduced by 42 μm As compared with the example (line distance=168 μm, n=12) shown in FIGS. 1 and 3, and is thus approximately 126 μm (m=9). In other words, the line distance is reduced by 25%.

It is to be noted that, in the present embodiment, only one charge transfer element is provided between adjacent light receiving elements 1A and 1B. Therefore, different from the prior art linear image sensor, pulse line $L_2$ is not disposed between two charge transfer elements, and aluminum wiring lines for supplying two-phase clocks $\phi_1$ and $\phi_2$ for driving signal charge transfer element 3AB and a polycrystalline silicon electrode which forms signal charge transfer element 3AB are connected in the following manner.

One of two aluminum wiring lines 5, 5 for supplying two-phase clocks $\phi_1$ and $\phi_2$ to which clock $\phi_1$ is applied and polycrystalline silicon electrodes 11B which form signal charge transfer element 3AB are connected to each other via contacts 6 at extensions of element separation region 12 which separates light receiving elements 1A from each other. Meanwhile, the aluminum wiring line to which clock $\phi_2$ is applied and polycrystalline silicon electrodes 11B which form signal charge transfer element 3AB are connected to each other via contacts 6 at extensions of element separation region 12 which separates light receiving elements 1B from each other.

Figure 7:
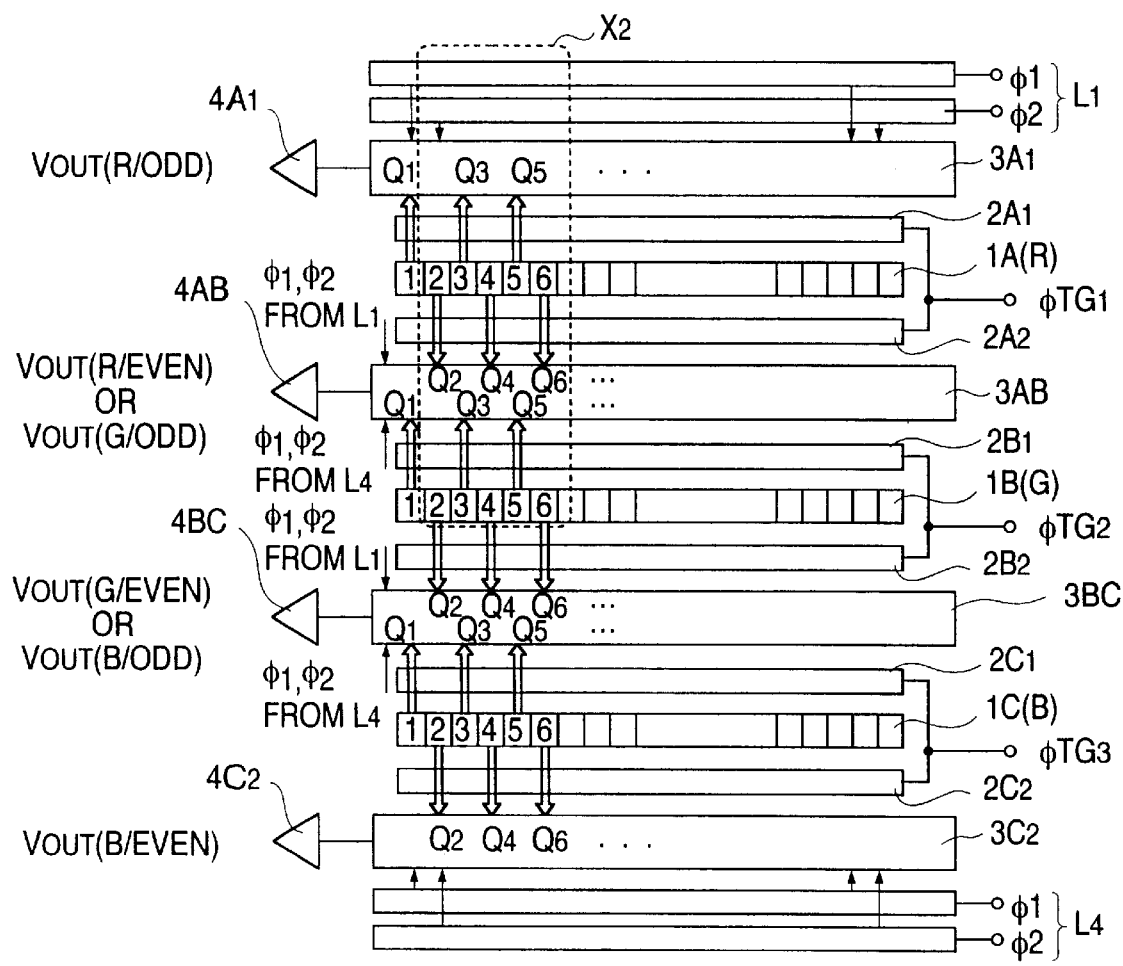
FIG. 7 is a schematic view showing a general construction of a color linear image sensor according to a second embodiment of the present invention.

FIG. 7 is a schematic view showing a general construction of a second embodiment of a color linear image sensor of the present invention. The second embodiment is described with reference to FIGS. 7 and 4.

The present embodiment is different from the first embodiment in that the pulse lines for feeding two-phase clocks $\phi_1$ and $\phi_2$ to signal charge transfer elements 3AB and 3BC provided between light receiving elements 1A and 1B and between light receiving elements 1B and 1C are eliminated. In the present embodiment, supplying of clocks $\phi_1$ and $\phi_2$ to signal charge transfer elements 3AB and 3BC is performed by pulse lines $L_1$ and $L_4$ disposed on the further outer sides of signal charge transfer elements $3A_1$ and $3C_2$ on the other sides. It is to be noted that the driving method is the same as the driving method in the first embodiment.

Figure 8:
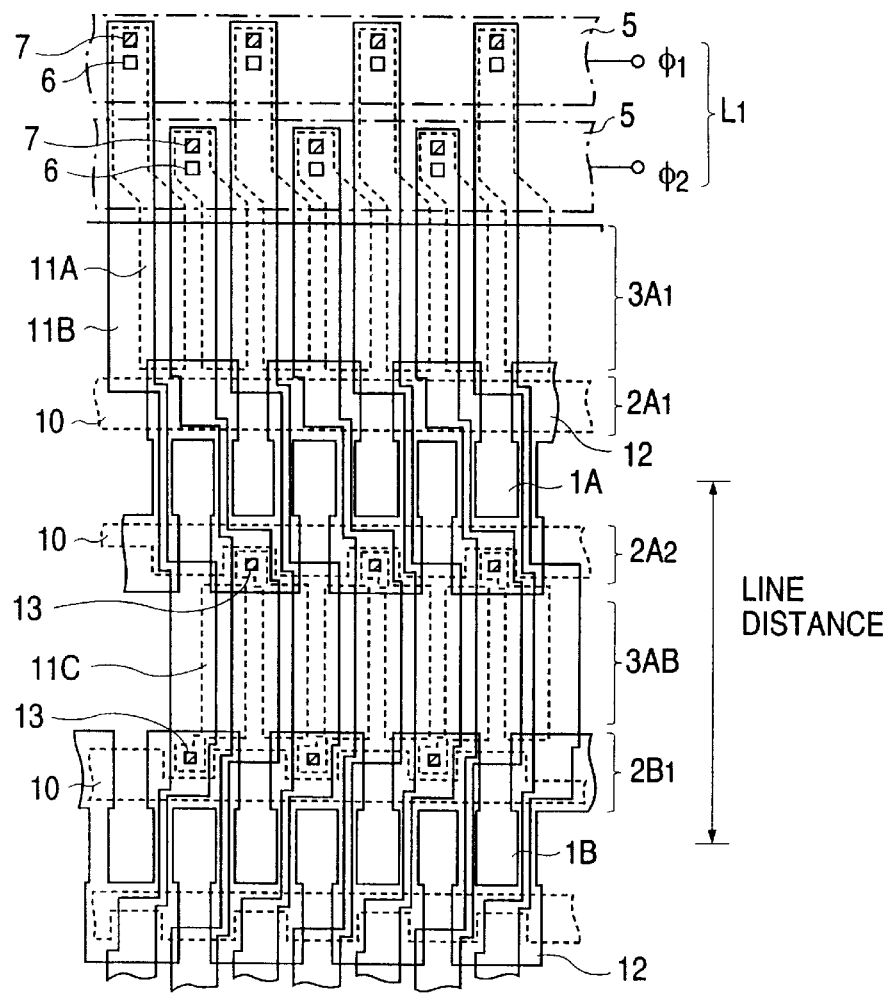
FIG. 8 is a schematic view showing a region surrounded by broken line X$_2$ in FIG. 7 in an enlarged scale.

FIG. 8 is a schematic view showing a region surrounded by broken line $X_2$ in FIG. 7 in an enlarged scale, and the line distance in the present embodiment is described with reference to FIG. 8.

The lengths of light receiving elements 1A and 1B, charge read-out elements $2A_2$ and $2B_1$ and signal charge transfer element 3AB in the direction in which the line distance is defined are equal to the lengths of light receiving elements 1A and 1B, charge read-out elements $2A_2$ and $2B_1$ and signal charge transfer element 3AB in FIG. 6, respectively. In the present embodiment, the polycrystalline silicon electrodes of 11A, 11B and 11C (1 113) which form signal charge transfer elements $3A_1$, 3AB, 313C and $3C_2$ are connected on element separation region 12 which separates pixels of light receiving elements 1A, 1B and 1C from each other, thereby eliminating the pulse lines for two-phase clocks $\phi_1$ and $\phi_2$ for driving signal charge transfer elements 3AB and 3BC, respectively. It is to be noted that, in signal charge transfer element 3AB, polycrystalline silicon electrodes 11C which form the charge transfer element are connected via contacts 13 to polycrystalline silicon electrodes 11B which for m the charge transfer element.

Comparing FIG. 8 with FIG. 6, in the present embodiment, from among the factors which define the line distance, in addition to the fact that the number of charge transfer elements between adjacent light receiving elements is reduced to one, the pulse line (including element separation regions necessary for the pulse line) for driving a charge transfer element between adjacent light receiving elements is eliminated. Accordingly, the line distance can be reduced as much comparing with that in the first embodiment. As an example, where the values used in the prior art linear image sensor shown in FIGS. 1 and 3 are used, since the dimension of the element separation region including the pulse line is 42 $\mu$m, the line distance is reduced by further 42 m comparing with that of the first embodiment (line distance=126 $\mu$m, m=9) shown in FIGS. 4 and 6 and is 84 $\mu$m (m=6). In other words, the line distance is reduced by 50% comparing with that of the prior art linear image sensor.

It is to be noted that, in the present embodiment, since polycrystalline silicon electrodes 11B which form a charge transfer element are connected on an element separation region for separating pixels of light receiving elements from each other (no contact is required since they are polycrystalline silicon electrodes of the same type), the width of the element separation region at the location must be formed wider by approximately 1 to 2 $\mu$m than that in the first embodiment. Accordingly, the effective area of the light receiving elements (area of a portion surrounded by the element separation region and the charge read-out element) is decreased as much (by approximately 10 to 15%). However, since light incident to the element separation region of the light receiving elements is usually photo-electrically, converted to some degree in the semiconductor substrate and accumulated in either one of two adjacent light receiving elements, the degradation of the sensitivity of the light receiving elements remains at approximately 5% comparing with the first embodiment.

As described above, according to the present invention, since a color linear image sensor formed on a semiconductor substrate and including three rows of light receiving elements, signal charge transfer elements disposed adjacent to each of the light receiving elements, and signal charge read-out elements for reading out signal charges from the light receiving elements into the signal charge transfer elements, is constructed such that only one signal charge transfer element is provided between each adjacent ones of the three rows of light receiving elements and single ones of the charge read-out elements are disposed between each charge transfer element and two light receiving element on the opposite sides of the charge transfer element, the line distance between the three rows of light receiving elements can be reduced by at least more than approximately 25% readily comparing with the conventional color linear image sensor while the characteristics such as the sensitivity and the dynamic range are sacrificed little. The effect of the reduction contributes very much to compression of the external memory capacity.

What is claimed is:

1. A color linear image sensor formed on a semiconductor substrate comprising three rows of light receiving elements, signal charge transfer elements disposed on the opposite sides of each of said light receiving elements, and signal charge read-out elements for reading out signal charges from said light receiving elements into said signal charge transfer elements, wherein only one signal charge transfer element is provided between each two adjacent light receiving elements of said three rows, and the centrally positioned ones of said light receiving elements and those of said light receiving elements positioned on the opposite sides of the centrally positioned light receiving elements commonly and time divisionally use the signal charge transfer elements disposed between the centrally positioned light receiving elements and said opposite side light receiving elements, and wherein a first plurality of signal charges are read out during a cycle operation, from only one of a first, second, and third row of light receiving elements, to at least one of a first, second, third, and fourth signal charge transfer elements, by at least one of said signal charge read-out elements, and then a second plurality of signal charges are read out during said cycle operation, from only one of a remaining said first, second and third row of light receiving elements, to at least one of said first, second, third, and fourth signal charge transfer elements, by at least one of said signal charge read-out elements.

2. A color linear image sensor as claimed in claim 1, wherein each of said signal charge transfer elements is formed from a two-phase driven CCD, and in order to feed, to the signal charge transfer elements disposed between the centrally located light receiving elements and the light receiving elements disposed on the opposite sides of the centrally located light receiving elements, clocks of two positive and opposite phases for driving the signal charge transfer elements, a positive phase clock feeding line and an opposite phase clock feeding line are disposed such that each of said signal charge transfer elements is held therebetween.

3. A driving method using a color linear image sensor as claimed in claim 2, wherein a plurality of read-out signal charges from the centrally located light receiving elements of said three rows are read out to the signal charge transfer elements positioned on the opposite sides of the centrally located light receiving elements, and, when said read-out signal charges are to be transferred, reading out of said read-out signal charges from the light receiving elements on the opposite sides to the signal charge transfer elements on the opposite sides of the centrally located light receiving elements is interrupted for a time until transfer of all of said read-out signal charges from the centrally located light receiving elements is completed.

4. A color linear image sensor as claimed in claim 2, wherein, for each of the signal charge transfer elements disposed between the centrally located light receiving elements and the light receiving elements positioned on the opposite sides of the centrally located light receiving elements, in place of the positive phase clock feeding line and the opposite phase clock feeding line disposed such that each of the signal charge transfer elements is held therebetween, clocks are fed via clock feeding lines for the signal charge transfer elements disposed on each of an outermost side of each of an outermost said light receiving elements.

5. A driving method using a color linear image sensor as claimed in claim 4, wherein a plurality of read-out signal charges from the centrally located light receiving elements of said three rows are read out to the signal charge transfer elements positioned on the opposite sides of the centrally located light receiving elements, and, when said read-out signal charges are to be transferred, reading out of said read-out signal charges from the light receiving elements on the opposite sides to the signal charge transfer elements on the opposite sides of the centrally located light receiving elements is interrupted for a time until transfer of all of said read-out signal charges from the centrally located light receiving elements is completed.

6. A driving method using a color linear image sensor as claimed in claim 1, wherein a plurality of read-out signal charges from the centrally located light receiving elements of said three rows are read out to the signal charge transfer elements positioned on the opposite sides of the centrally located light receiving elements, and when said read-out signal charges are to be transferred, reading out of said read-out signal charges from the light receiving elements on the opposite sides to the signal charge transfer elements on the opposite sides of the centrally located light receiving elements is interrupted for a time until transfer of all of said read-out signal charges from the centrally located light receiving elements is completed.

7. A color linear image sensor as recited in claim 1, wherein a third plurality of signal charges are read out during said cycle operation, from only one of another remaining said first, second and third row of light receiving elements, to at least one of said first, second, third, fourth signal charge transfer elements, by at least one of said signal charge read-out elements.

8. A color linear image sensor as recited in claim 1, wherein during said cycle operation a plurality of odd numbered signal charges, obtained from one of said first and second plurality of signal charges, are read out by one of said signal charge read-out elements, and a plurality of even numbered signal charges, obtained from said one of said first and second plurality of signal charges, are read out by another of said signal charge read-out elements.

9. A color linear image sensor formed on a semiconductor substrate and including three rows of light receiving elements, signal charge transfer elements disposed on the opposite sides of each of said light receiving elements, and signal charge read-out elements for reading out signal charges from said light receiving elements into said signal charge transfer elements, wherein one signal charge transfer element is disposed between each two adjacent light receiving elements of said three rows, and one signal charge read-out element is disposed between each of the signal charge transfer elements and each of those of said light receiving elements on the opposite sides of the signal charge transfer element, and wherein a first plurality of signal charges are read out during a cycle operation, from only one of a first, second, and third row of light receiving elements, to at least one of a first, second, third, and fourth signal charge transfer elements, by at least one of said signal charge read-out elements, and then a second plurality of signal charges are read out during said cycle operation, from only one of a remaining said first, second and third row of light receiving elements, to at least one first, second, third, and fourth signal charge transfer elements, by at least one of said signal charge read-out elements.

10. A color linear image sensor as claimed in claim 9, wherein each of said signal charge transfer elements is formed from a two-phase driven CCD, and in order to feed, to the signal charge transfer elements disposed between the centrally located light receiving elements and the light receiving elements disposed on the opposite sides of the centrally located light receiving elements, clocks of two positive and opposite phases for driving the signal charge transfer elements, a positive phase clock feeding line and an opposite phase clock feeding line are disposed such that each of said signal charge transfer elements is held therebetween.

11. A driving method using a color linear image sensor as claimed in claim 10, wherein a plurality of read-out signal charges from the centrally located light receiving elements of said three rows are read out to the signal charge transfer elements positioned on the opposite sides of the centrally located light receiving elements, and, when said read-out signal charges are to be transferred, reading out of said read-out signal charges from the light receiving elements on the opposite sides to the signal charge transfer elements on the opposite sides of the centrally located light receiving elements is interrupted for a time until transfer of all of said read-out signal charges from the centrally located light receiving elements is completed.

12. A color linear image sensor as claimed in claim 10, wherein, for each of the signal charge transfer elements disposed between the centrally located light receiving elements and the light receiving elements positioned on the opposite sides of the centrally located light receiving elements, in place of the positive phase clock feeding line and the opposite phase clock feeding line disposed such that each of the signal charge transfer elements is held therebetween, clocks are fed via clock feeding lines for the signal charge transfer elements disposed on the outer sides of the light receiving elements on the outer sides.

13. A driving method using a color linear image sensor as claimed in claim 12, wherein a plurality of read-out signal charges from the centrally located light receiving elements of said three rows are read out to the signal charge transfer elements positioned on the opposite sides of the centrally located light receiving elements, and, when said read-out signal charges are to be transferred, reading out of said read-out signal charges from the light receiving elements on the opposite sides to the signal charge transfer elements on the opposite sides of the centrally located light receiving elements is interrupted for a time until transfer of all of said read-out signal charges from the centrally located light receiving elements is completed.

14. A driving method using a color linear image sensor as claimed in claim 9, wherein a plurality of read-out signal charges from the centrally located light receiving elements of said three rows are read out to the signal charge transfer elements positioned on the opposite sides of the centrally located light receiving elements, and, when said read-out signal charges are to be transferred, reading out of said read-out signal charges from the light receiving elements on the opposite sides to the signal charge transfer elements on the opposite sides of the centrally located light receiving elements is interrupted for a time until transfer of all of said read-out signal charges from the centrally located light receiving elements is completed.

15. A color linear image sensor as recited in claim 9, wherein a third plurality of signal charges are read out during said cycle operation, from only one of another remaining said first, second and third row of light receiving elements, to at least one of said first, second, third, and fourth signal charge transfer elements, by at least one of said signal charge read-out elements.

16. A color linear image sensor as recited in claim 9, wherein during said cycle operation a plurality of odd numbered signal charges, obtained from one of said first and second plurality of signal charges, are read out by one of said signal charge read-out elements, and a plurality of even numbered signal charges, obtained from said one of said first and second plurality of signal charges, are read out by another of said signal charge read-out elements.

17. A color linear image sensor formed on a semiconductor substrate comprising a first row of light receiving elements, having
a first signal charge transfer element disposed on one side of said first row of light receiving elements,
a second signal charge transfer element disposed on an opposite side of said first row of light receiving elements, a second row of light receiving elements, having
said second signal charge transfer element disposed on one side of said second row of light receiving elements,
a third signal charge transfer element disposed on an opposite side of said second row of light receiving elements, a third row of light receiving elements, having
said third signal charge transfer element disposed on one side of said third row of light receiving elements,
a fourth signal charge transfer element disposed on an opposite side of said third row of light receiving elements, a first signal charge read-out element, disposed between said first row of light receiving elements and said first signal charge transfer element, a second signal charge read-out element, disposed between said first row of light receiving elements and said second signal charge transfer element, a third signal charge read-out element, disposed between said second row of light receiving elements and said second signal charge transfer element, a fourth signal charge read-out element, disposed between said second row of light receiving elements and said third signal charge transfer element, a fifth signal charge read-out element, disposed between said third row of light receiving elements and said third signal charge transfer element, a sixth signal charge read-out element, disposed between said third row of light receiving elements and said fourth signal charge transfer element, and wherein only one of said signal charge transfer elements is provided between any two adjacent said row of light receiving elements, and wherein during a first phase of a cycle operation, a first plurality of signal charges are read-out, from only one of said first, second, and third row of light receiving elements, to at least one of said first, second, third, and fourth signal charge transfer elements, by at least one of said signal charge read-out elements, and then during a second phase of said cycle operation, a second plurality of signal charges are read-out, from only one of a remaining said first, second and third row of light receiving elements, to at least one of said first, second, third, and fourth signal charge transfer elements, by at least one of said signal charge read-out elements.

18. A color linear image sensor as recited in claim 17, wherein a nearest pair of signal charge read-out elements are utilized for reading out signal charges, from each of said first, second, and third row of light receiving elements, into each of two nearest signal charge transfer elements that are respectively nearest to said one, and said opposite, side of said first, second, and third row of light receiving elements.

19. A color linear image sensor as recited in claim 17, wherein each of said first, second, and third row of light receiving elements have a substantially similar physical size construction.

20. A color linear image sensor as recited in claim 17, wherein each of said first, second, and third row of light receiving elements have a substantially similarly organized physical layout construction.

21. A color linear image sensor as recited in claim 17, wherein during a third phase of said cycle operation, a third plurality of signal charges are read-out, from only one of another remaining said first, second and third row of light receiving elements, to at least one of said first, second, third, and fourth signal charge transfer elements, by at least one of said signal charge read-out elements.

22. A color linear image sensor as recited in claim 17, wherein each of said signal charge transfer elements is formed from a two-phase driven CCD, and in order to feed, to said signal charge transfer elements disposed between a plurality of centrally located light receiving elements, and each of two pluralities of light receiving elements that are disposed on opposite sides of said centrally located light receiving elements, clocks of two positive and opposite phases for driving said signal charge transfer elements, a positive phase clock feeding line and an opposite phase clock feeding line are disposed such that each of said signal charge transfer elements is held therebetween.

23. A color linear image sensor as recited in claim 22, wherein a plurality of read-out signal charges from said centrally located light receiving elements of said three rows are read out to said signal charge transfer elements positioned on said opposite sides of said centrally located light receiving elements, and, when said read-out signal charges are to be transferred, reading out of said read-out signal charges from said light receiving elements on said opposite sides to said signal charge transfer elements on said opposite sides of said centrally located light receiving elements is interrupted for a time until transfer of all of said read-out signal charges from said centrally located light receiving elements is completed.

24. A color linear image sensor as recited in claim 22, wherein, for each of said signal charge transfer elements disposed between said centrally located light receiving elements and said light receiving elements positioned on said opposite sides of said centrally located light receiving elements, in place of said positive phase clock feeding line and said opposite phase clock feeding line disposed such that each of said signal charge transfer elements is held therebetween, clocks are fed via clock feeding lines for said signal charge transfer elements disposed on each of an outermost side of each of an outermost said light receiving element.

25. A color linear image sensor as recited in claim 24, wherein a plurality of read-out signal charges from said centrally located light receiving elements of said three rows are read out to said signal charge transfer elements positioned on said opposite sides of said centrally located light receiving elements, and, when said read-out signal charges are to be transferred, reading out of said read-out signal charges from said light receiving elements on said opposite sides to said signal charge transfer elements on said opposite sides of said centrally located light receiving elements is interrupted for a time until transfer of all of said read-out signal charges from said centrally located light receiving elements is completed.

26. A color linear image sensor as recited in claim 17, wherein a plurality of read-out signal charges from said centrally located light receiving elements of said three rows are read out to said signal charge transfer elements positioned on said opposite sides of said centrally located light receiving elements, and, when said read-out signal charges are to be transferred, reading out of said read-out signal charges from said light receiving elements on said opposite sides to said signal charge transfer elements on said opposite sides of said centrally located light receiving elements is interrupted for a time until transfer of all of said read-out signal charges from said centrally located light receiving elements is completed.

27. A color linear image sensor as recited in claim 17, wherein a plurality of pulse lines, for feeding two-phase clock signals to at least one signal charge transfer element, are not physically located substantially between
(a) a middle row of light receiving elements, and
(b) two signal charge transfer elements, wherein said two signal charge transfer elements are physically nearest said middle row of light receiving elements.

* * * * *